United States Patent
Eriksen

(10) Patent No.: US 7,600,028 B2
(45) Date of Patent: Oct. 6, 2009

(54) METHODS AND SYSTEMS FOR OPPORTUNISTIC COOKIE CACHING

(75) Inventor: Bjorn Marius Aamodt Eriksen, Mountain View, CA (US)

(73) Assignee: Google Inc., Mountain View, CA (US)

( * ) Notice: Subject to any disclaimer, the term of this patent is extended or adjusted under 35 U.S.C. 154(b) by 908 days.

(21) Appl. No.: 11/033,411

(22) Filed: Jan. 10, 2005

(65) Prior Publication Data

US 2006/0156387 A1    Jul. 13, 2006

(51) Int. Cl.
  G06F 15/16   (2006.01)
  G06F 17/00   (2006.01)

(52) U.S. Cl. .................. 709/227; 707/101; 707/102

(58) Field of Classification Search .......... 707/101, 707/102, 103, 104; 713/150; 709/227, 217, 709/203
See application file for complete search history.

(56) References Cited

U.S. PATENT DOCUMENTS

| | | | |
|---|---|---|---|
| 6,195,622 B1 | 2/2001 | Altschuler et al. ............. 703/2 |
| 6,366,947 B1 | 4/2002 | Kavner ....................... 709/203 |
| 6,564,213 B1 * | 5/2003 | Ortega et al. .................. 707/5 |
| 6,725,269 B1 | 4/2004 | Megiddo ..................... 709/228 |
| 7,225,256 B2 * | 5/2007 | Villavicencio ............... 709/225 |
| 7,299,403 B1 * | 11/2007 | Cleasby et al. ............... 715/738 |
| 7,379,980 B1 * | 5/2008 | Gilbert ........................ 709/220 |
| 7,412,535 B2 * | 8/2008 | Agarwalla et al. ........... 709/236 |
| 2002/0057678 A1 | 5/2002 | Jiang et al. .................. 370/353 |
| 2002/0078192 A1 * | 6/2002 | Kopsell et al. ............... 709/223 |
| 2002/0120685 A1 | 8/2002 | Srivastava et al. ........... 709/203 |
| 2004/0049673 A1 * | 3/2004 | Song et al. ................... 713/150 |
| 2004/0205149 A1 | 10/2004 | Dillion et al. ................ 709/217 |

OTHER PUBLICATIONS

Huican Zhu, Class-based Cache Management for Dynamic Web Content, 2001, ACM library, pp. 1219.*
Kristol, D., et al., "HTTP State Management Mechanism, RCF 2109" Feb. 1997.
Kristol, D., et al., "HTTP State Management Mechanism RCF 2965," Oct. 2000.

* cited by examiner

*Primary Examiner*—Hassan Phillips
*Assistant Examiner*—Joseph L Greene
(74) *Attorney, Agent, or Firm*—Morgan, Lewis & Bockius LLP

(57) ABSTRACT

Caching cookies in a server includes observing cookies in document requests generated from a client and in responses from web hosts and storing them in a data structure based on certain conditions to maintain a path invariance condition. The cookies may be stored in a trie data structure. Upon certain conditions, cookies in the trie may be coalesced if they are equivalent and nodes of the trie may be collapsed. A server may retrieve cookies from the cache for use in a prefetch operation.

22 Claims, 9 Drawing Sheets

METHODS AND SYSTEMS FOR OPPORTUNISTIC COOKIE CACHING

FIELD OF THE INVENTION

The present invention relates generally to the field of a client-server computer network system, and in particular, to methods and systems for opportunistically caching cookies for use in document retrieval requests.

BACKGROUND OF THE INVENTION

Web browsing is becoming a common part of daily life for many people. Documents are often retrieved from the Internet through a web browser. However, for some people, document download speeds may not be as fast as desired.

One approach to alleviating the speed problem is to have a server-side system that prefetches web documents and pre-loads them into a client before a user of the client actually requests the document. However, it is also important to prefetch and preload the proper version of the documents. The content of a document that is actually presented to a user often depends on the state of the user's browsing session. Information about the browsing session state may be stored in cookies.

A server-side prefetch system may have its own set of cookies for use in prefetching documents. However, a server-side prefetch system may not be able to access the full set of cookies stored at a client.

Accordingly, methods and systems that obtain and store cookies in a way that facilitates selection of acceptable cookies for use in prefetch operations is highly desirable.

SUMMARY OF THE INVENTION

According to one embodiment, there is provided a method of using cookies. A first cookie is received and stored in a data structure. A second cookie is also received and stored in the data structure while preserving a predefined path invariance condition with respect to the path attributes of the first and second cookies.

BRIEF DESCRIPTION OF THE DRAWINGS

For a better description of the nature and objects of the invention and embodiments, reference should be made to the following detailed description, taken in conjunction with the accompanying drawings, in which.

DESCRIPTION OF THE EMBODIMENTS

Figure 1:
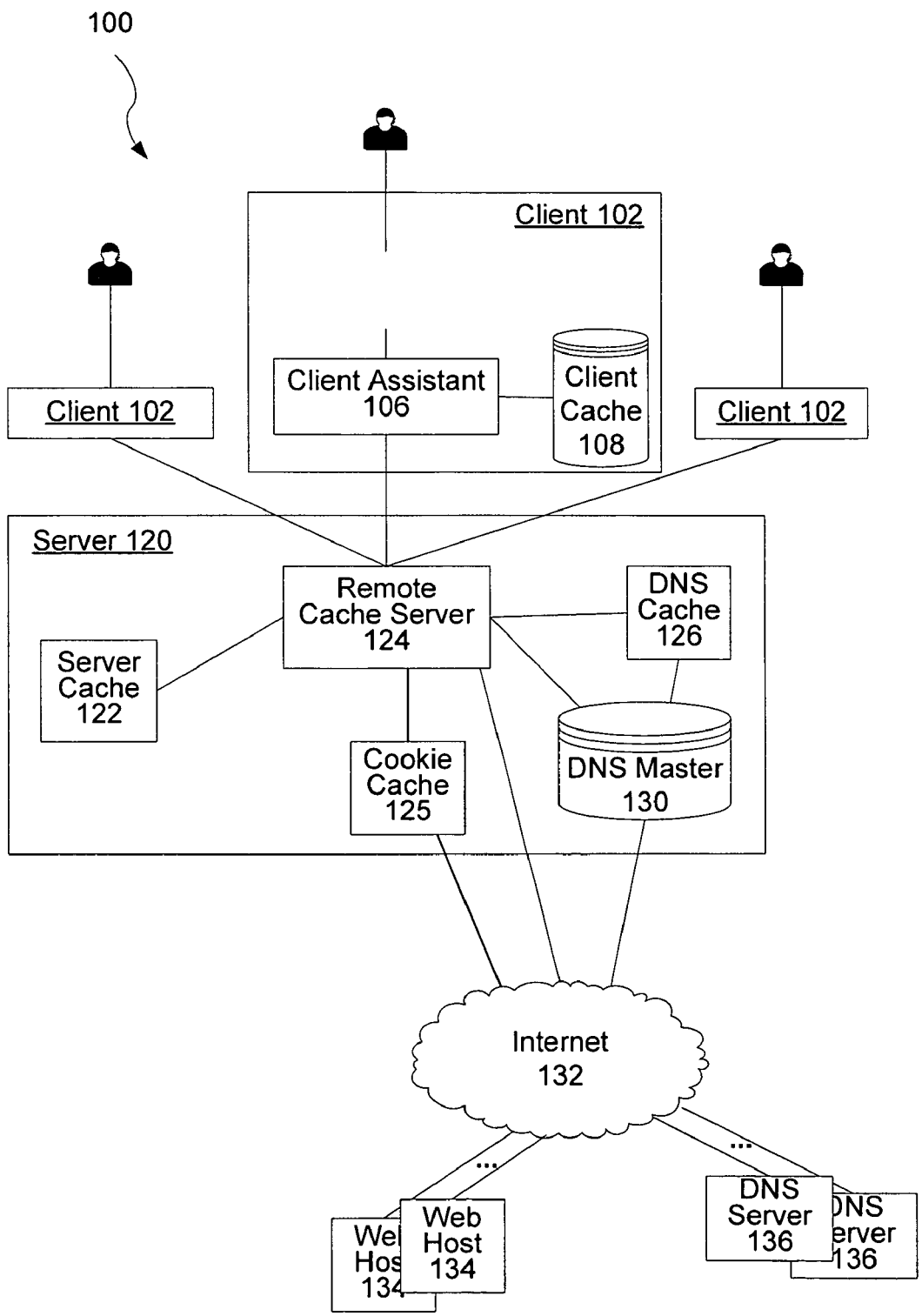
FIG. 1 is a block diagram of a client-server network environment, according to some embodiments of the invention.

FIG. 1 schematically illustrates the infrastructure of a client-server network environment 100, according to some embodiments of the invention. The environment 100 includes a plurality of clients 102 and a server 120. The internal structure of a client 102 includes an application 104 (e.g., a web browser 104), a client assistant 106 and a client cache 108. The client assistant 106 has communication channels with the application 104, the client cache 108 and a remote cache server 124 running in the server 120, respectively. The client assistant 106 and remote cache server 124 may be procedures or modules that facilitate the process of responding quickly to a document request initiated by a user of the client 102. In some embodiments, cache assistant 106 may be located on a computer remote from client 102, e.g. a client-side proxy server (not shown).

In some embodiments, the application 104 has no associated cache or does not use its associated cache, and instead directs all user requests to the client assistant 106. While the following discussion assumes, for ease of explanation, that the application 104 is a web browser, the application can, in fact, be any application that uses documents whose source is a network address such as a URL (universal resource locator), whether the resource is located somewhere in the network or on the client 102. Similarly, whenever the term "URL" is used in this document, that term shall be understood to mean a network address, a local address, a document identifier or other information item identifier. In this context, the term "document" means virtually any type of file, set of information or informational item that may be used by a web browser or other application, including but not limited to audio, video, or multimedia files. According to some embodiments, an advantage of the arrangement shown in FIG. 1 is that all the web browsers or other applications in client 102 can share the same client cache and thereby avoid data duplication. However, in alternative embodiments, application 104 uses its own cache (not shown). In this case, the client assistant 106 keeps the application cache 104 in sync with the client cache 108.

The server 120 includes at least a server cache 122. In some embodiments, the server 120 and/or the server cache 122 are deployed over multiple computers in order to provide fast access to a large number of cached documents. For instance, the server cache 122 may be deployed over N servers, with a mapping function such as the "modulo N" function being used to determine which cached documents are stored in each of the N servers. N may be an integer greater than 1, for instance an integer between 2 and 1024. For convenience of explanation, we will discuss the server 120 as though it were a single computer. The server 120, through its server cache 122, manages a large number of documents that have been downloaded from various web hosts 134 (e.g., web servers and other hosts) over the communications network 132.

In some embodiments, the server 120 also includes a cookie cache 125, a DNS cache 126, and a DNS master 130, which may be connected. In alternative embodiments, server 120 does not include the DNS cache 126 and DNS master 130. In some embodiments, these various components co-exist in a single computer, while in some other embodiments, they are distributed over multiple computers. The remote cache server 124 communicates with the other components in the server 120 over an intranet (not shown), and communicates with web hosts 134 and domain name system (DNS)

servers 136 over the Internet 132. The term "web host" is used in this document to mean a host, host server or other source of documents or informational items. Most, but not necessarily all documents are stored at or are associated with network locations. Each web host may have a domain name. The location of a document within a web host is specified by its path (e.g., in the URL "http://labs.google.com/labsterms.html", the web host is "labs.google.com" and the path is "/"). In some embodiments, all paths have an initial "/" (forward slash) character.

In some embodiments, unlike the HTTP connection between a web browser and a web server, a persistent connection (sometimes herein called a dedicated connection) is established between the client assistant 106 and the remote cache server 124 using a suitable communication protocol (e.g., TCP/IP). This persistent connection helps to reduce the communication latency between the client assistant 106 and the remote cache server 124. In some embodiments, the persistent connection comprises at least one control stream and multiple data streams in each direction.

Server 120 may prefetch documents from web hosts and send them to client assistant 106. That is, server 120 retrieves a document from a web host 134 before actually receiving a user request for the document and sends the document to client assistant 106 for storage in the client cache 108. Server 120, in generating the prefetch request, may include one or more cookies in the request. A cookie conveys information about the state of a web browsing session. A cookie comprises a name and value pair. For example, the cookie "Shipping="FedEx"" has the name "Shipping" and value "FedEx". A cookie also may have an optional domain attribute specifying the domain for which the cookie is valid and an optional path attribute specifying the subset of URLs on the web host to which the cookie applies, both of which may be specified in the cookie explicitly or may be given defaults. One or more cookies may be included in a "Cookie" header. A more detailed discussions of cookies is provided in Request for Comments (RFC) 2965, available from the Internet Engineering Task Force (IETF).

Cookies are selected for inclusion in a document request based, in part, on domain and path attributes. For a cookie to be selected for inclusion in a document request, the domain name of the web host where the document is located must domain-match the cookie's domain attribute if one exists, and the path attribute of the cookie must be an exact match or a prefix of the document's path if one exists. If no cookie satisfies the above criteria, then no cookie is included in the request. Domain A domain-matches domain B if both domains match exactly. Additionally, A domain-matches B if A is a host domain name of the form NB, where N is a non-empty string, and B is of the form B', and B' is a fully-qualified domain name. For example, "a.b.com" domain-matches ".b.com" but not "b.com". Furthermore, domain-matching is not commutative. Thus, "a.b.c.com" domain-matches ".c.com", but ".c.com" does not domain-match "a.b.c.com". Furthermore, for a cookie to be included in a request, the cookie must not have expired and be acceptable for the port to which the cookie would be sent. See RFC 2965 for more information about cookies generally and the criteria for selecting cookies for inclusion in a document request.

Cookies used by each respective client 102 may be stored at the respective client 102, for access by modules or instructions running on the respective client 102, such as application 104 and/or client assistant 106. Server 120 may have its own set of cookies for use in prefetch requests. In some embodiments, the set of cookies used by server 120 is stored in cookie cache 125. Server 120 may not have direct access to the entire set of cookies stored on each client 102 because application 104 and client assistant 106 may not always utilize server 120 in obtaining documents. Accordingly, server 120 will observe a truncated set of the cookies stored at client 102 (i.e., only those observed when server 120 is utilized). Server 120 populates cookie cache 125 with cookies that are observed, by server 120, in transit between clients 102 and web hosts 134. The set of cookies in cookie cache 125 may only be a subset of the aggregate of sets of cookies on each client 102 serviced by server 120.

A number of data structures could be used to store the cookies in the cookie cache 125. In some embodiments, the data structure used in cookie cache 125 is a trie data structure. A trie is a specialized tree data structure that allows for organization of cookies based on the domain and path attributes of the cookies. Furthermore, tries are useful for string prefix matching, which is used in some embodiments for determining which cookies are to be included in a request.

Figure 2:
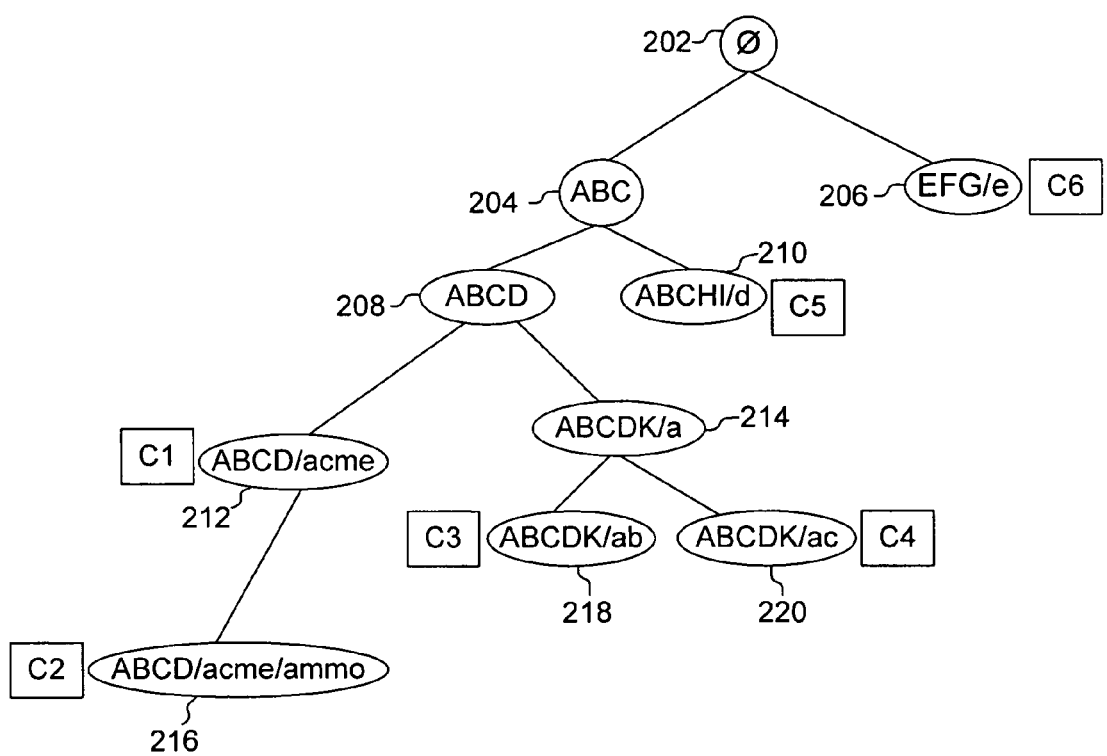
FIG. 2 is a diagram of an exemplary cookie trie within the cookie cache, according to some embodiments of the invention.

FIG. 2 is a diagram of an exemplary cookie trie within cookie cache 125, according to some embodiments of the invention. In some embodiments, cookie cache 125 includes multiple cookie tries, with one trie per client. In alternative embodiments, cookie cache 125 may have one cookie trie per user per client. For convenience of explanation, cookie cache 125 is assumed to have one cookie trie per client. In some embodiments, a cookie trie may be identified by a client ID associated with the particular client. A cookie trie belonging to a client 102 stores the cookies observed in transit between that client 102 and web hosts 134.

A trie is an ordered tree data structure, where each node's position in the trie represents a key, expressed as a string, and some data (which, in a cookie trie, are cookies) may be associated with that key. The key string includes tokens, which, in some embodiments, are made of one or more characters. For convenience of explanation, keys in the cookie trie are discussed as strings of characters. Each node adds one character to the key represented by its parent node. A node does not store the key itself, but does store any cookie that is associated with the key represented by that node. Not every node has a cookie stored, but each cookie of interest is stored at a node. The root node of a cookie trie represents an empty string key, as shown in node 202 in the cookie trie of FIG. 2. The key represented by a node is a prefix of the key(s) represented by its descendent(s), if any. For example, in FIG. 2, the keys represented by nodes 210 (key "ABCHI/d") and 208 (key "ABCD") have the key represented by node 204 (key "ABC") as a prefix. Furthermore, the further descendents of node 208 represent keys that have the key represented by node 204 ("ABC") as a prefix. For purposes of this description, a key is not considered to be a prefix of itself. Thus, key "ABC" is not considered to be a prefix of key "ABC".

In some embodiments, the cookie trie is a PATRICIA trie. A PATRICIA trie is a specialized form of trie, wherein a node that is an only child can collapse into its parent to form one node. The resulting node's position represents the same key as that represented by the only child node. For example, if a node represents a key "XYZA", and its only child represents key "XYZAB", then the child may be collapsed into the parent to form one node that represents key "XYZAB". However, because there are cookies stored at nodes, an additional limitation on collapsing an only child node into its parent node is that the two nodes can collapse only if one or both nodes have no cookie. Thus, for example, if a node with key "AB" and its only child with key "ABCD" both have no cookie, then they can be collapsed into a node with key "ABCD". If the node with key "AB" has a cookie and the only child with key "ABCD" has none, or vice versa, then they can be collapsed into a node with key "ABCD". If both nodes have any number of cookies, with each node having at least one cookie, then they cannot be collapsed into one node. Collapsing nodes helps to reduce the size of the trie, by reducing the number of nodes, while preserving the invariance of keys that have data associated with them.

In some embodiments, collapsing of nodes is done in a way such that any cookie stored at a collapsed node has a path attribute that is the same as the path attribute represented by the collapsed node. For example, if there are consecutive nodes representing paths "/a", "/ab", and "/abc", respectively, and there is a cookie, with path attribute "/ab" at the node representing path "/ab", then the collapsing is between the nodes representing path attributes "/a" and "/ab", such that the cookie in the resulting node has a path attribute ("/ab") that is the same as the path attribute represented by the resulting node. Further details about the collapsing of nodes are described in relation to FIGS. 6A-6F.

In some embodiments, the key associated with a cookie in a cookie trie is a string formed by the prepending of the domain attribute to the path attribute of the cookie (i.e., the domain attribute and the path attribute are concatenated, with the domain attribute preceding the path attribute).

A trie is useful for prefix matching, which is used for determining if a cookie's path qualifies it for inclusion in a request. However, domain-matching is not prefix matching. Indeed, prefix matching on domains would result in some cookies being sent to web hosts not allowed to receive the cookie. For example, a web host with domain "www.com" is not allowed to receive a cookie with domain attribute "www.com.foo.com". Thus, in some embodiments, the domain attribute of a cookie is hashed by a hash function. The resulting hashed domain attribute is prepended to the path attribute instead to form the key string. The hash function converts the domain attribute to a string that prevents the prefix matching situation discussed above, yet still allows for exact-matching of the domain or domain-matching according to RFC 2965 using the prefix matching properties of the cookie trie. In alternative embodiments, cookie cache 125 can have a cookie trie per domain, per client. In that case, the key associated with a cookie will just be its path attribute. Additionally, in some embodiments, a port number can also be a part of the key, along with the domain and path attributes. The port number restricts the port to which the cookie may be returned and in some instances identifies the application for which the document is used.

FIG. 2 illustrates some examples of nodes representing keys corresponding to domain and path attributes. In FIG. 2, node 206 represents the key "EFG/e". The key "EFG/e" corresponds to the hashed domain attribute "EFG" and path "/e". Cookie C6 is stored at node 206. Thus, the hashed domain attribute of the cookie C6 is "EFG" and the cookie's path attribute is "/e". Node 204 (key "ABC") has two children: node 208 (key "ABCD") and node 210 (key "ABCHI/d"). Node 204 represents a prefix "ABC" of the keys represented by nodes 208 (and its descendents) and 210. Node 208 represents a prefix "ABCD" of the keys represented by nodes 212 and 214 (and their descendents). Node 210 has cookie C5 with hashed domain attribute "ABCHI" and path attribute "/d". Node 208 has children node 212 (key "ABCD/acme") and node 214 (key "ABCDK/a"). Node 212 has cookie C1, with hashed domain attribute "ABCD" and path attribute "/acme". Node 214 represents a prefix "ABCDK/a" of the keys represented by nodes 218 and 220. Node 212 has child node 216 (key "ABCD/acme/ammo"). Node 214 has children nodes 218 (key "ABCDK/ab") and 220 (key "ABCDK/ac"). Node 216 has cookie C2, with hashed domain attribute "ABCD" and path attribute "/acme/ammo". Node 218 has cookie C3, with hashed domain attribute "ABCDK" and domain attribute "/ab". Node 220 has cookie C4, with hashed domain attribute "ABCDK" and domain attribute "/ac". Further details about the cookie trie are discussed in relation to FIGS. 6A-6F.

Figure 3:
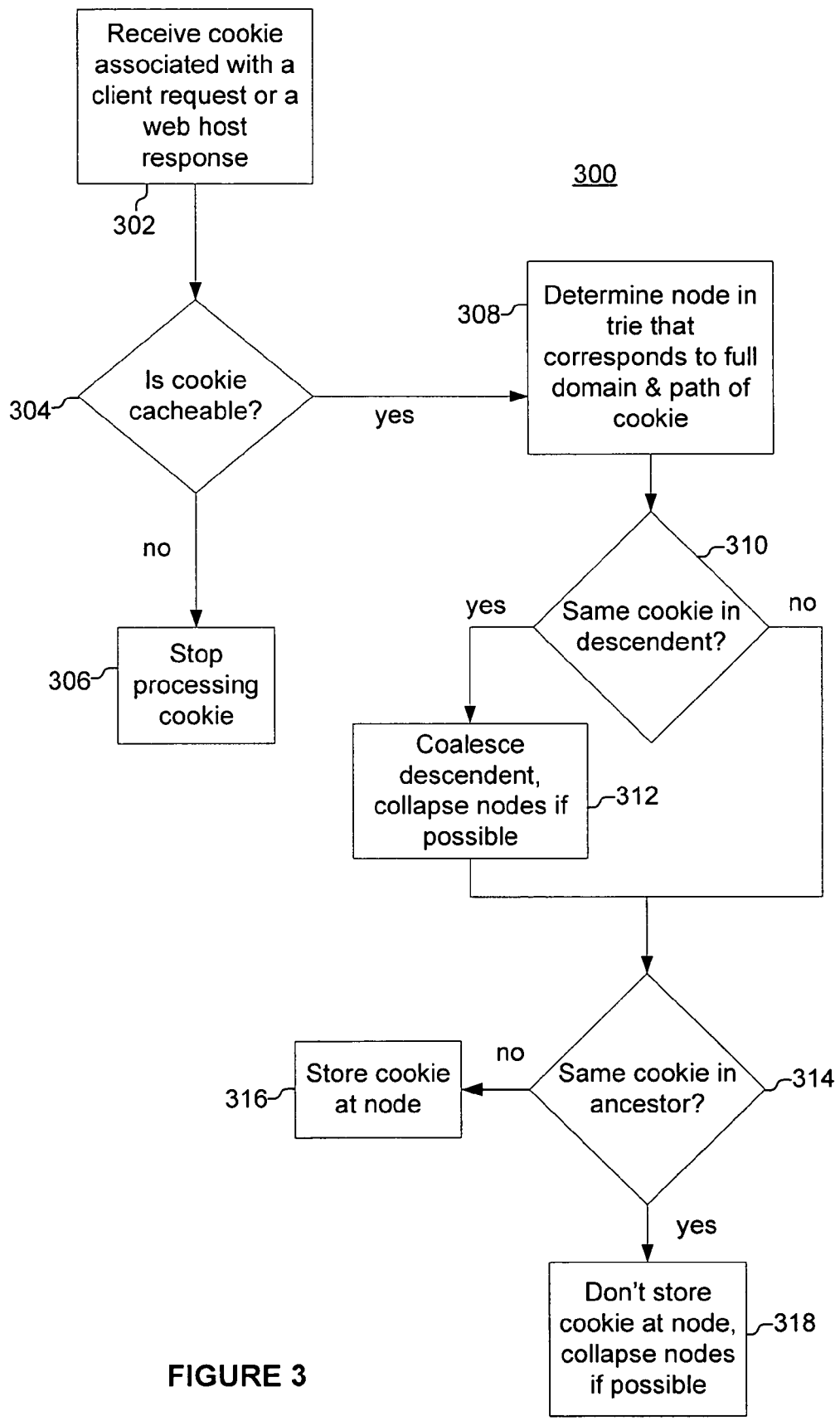
FIG. 3 is a flowchart illustrating an insertion or update of a cookie in the cookie cache, according to some embodiments of the invention.

FIG. 3 is a flow chart of an exemplary process 300 for inserting or updating cookies in cookie cache 125, according to some embodiments of the invention. Server 120 receives a cookie (302) included in either a document request from a client 102 (that is to be passed on to a web host 134) or a response from a web host 134 (in response to a request). The cookie may be located in certain headers in the document request or web host response. For example, the Set-Cookie2 and Cookie headers for web host responses and requests, respectively, may designate the cookies included in a response or request according to RFC 2965. A Cookie header included in a document request comprises zero or more cookies, i.e., name-value pairs. A response may have zero or more Set-Cookie2 headers, each having at least one cookie. In some embodiments, cookies are treated as individual name-value pairs; each name-value pair in a header is a cookie that is processed separately from other name-value pairs, if any, in the request or response. In this case, server 120 will receive all of the cookies in the header and process them simultaneously or in a predefined order, such as the order in which the cookies were listed in the header. In alternative embodiments, the one or more name-value pairs that are included with a request or response is treated as one set. The whole set of name-value pairs is treated as one cookie. For a cookie comprising a set of name-value pairs, the path attribute of the cookie is the most specific path attribute amongst path attributes of the name-value pair(s) in the cookie, and the domain attribute of the cookie is the most specific domain attribute amongst domain attributes of the name-value pair(s) in the cookie. In some embodiments, any one node in the cookie tries of cookie cache 125 is capable of storing one or more cookies, i.e., storing one or more name-value pairs. Thus, in embodiments that treat cookies as individual name-value pairs, a node in the cookie trie can store one or more cookies of different names. In embodiments that treat cookies as sets of name-value pairs, a node can store one cookie comprising one or more name-value pairs, including any duplicate name-value pairs or pairs with the same name and different values. For purposes of simplifying the following discussion, the various features of the invention are described, for the most part, with respect to embodiments where name-value pairs are treated individually. The concepts readily extend to treating a set of name-value pairs.

After server 120 receives a cookie, it determines if the cookie is cacheable (304). A cookie is uncacheable if it was designated as such by the web host that sent the cookie. For example, a cookie expiration date in the past may be specified by the web host. A cookie is also uncacheable if it has certain domain or path attributes. RFC 2965 specifies that a cookie from a Set-Cookie2 header is to be rejected (not stored at all) if: the path attribute of the cookie is not a prefix of the path of the document accompanying the Set-Cookie header; the domain attribute of the cookie has no embedded dots nor is it the string ".local"; the domain of the web host sending the Set-Cookie2 header does not domain-match the domain attribute of the cookie; or the domain of the web host sending the Set-Cookie2 header is a domain name of the form HD, where D is the domain attribute of the cookie, and H is a string with one or more dots. Furthermore, depending on the trust relationship between client 102 and server 120, server 120 may choose not to cache any cookie that has the "Secure" attribute.

If the cookie is not cacheable (304—no), then the server 120 will stop processing that cookie for insertion or update into the cookie cache (306). If the cookie is cacheable (304—yes), then the server 120 proceeds to determine the proper location within the cookie cache 125 to insert or update the cookie (308). The server 120 searches for the node within the trie, associated with the client to which the cookie belongs, that corresponds to the domain and path attributes of the cookie. To search for the node, the server 120 first identifies the trie in cookie cache 125 that is associated with the particular client to which the cookie belongs. Then, server 120 applies the hash function to the domain attribute of the cookie to get the hashed domain attribute. The hashed domain attribute is prepended to the path attribute of the cookie to form the key. Server 120 searches the trie for the node representing that key, using any suitable trie searching process. If the cookie does not have an explicit domain or path attribute specified, server 120 may use any predefined defaults. For example, RFC 2965 specifies that the default domain attribute and path attribute of a cookie in a Set-Cookie2 header that does not have either attribute specified is the domain of the web host sending the response and the path of the document accompanying the response, respectively. If the node is not found in the trie, e.g., because the server has not observed a cookie with the same domain and path attributes before, then it notes the position in the trie where the node should be.

Once the server 120 finds the node (hereinafter the "match node" for sake of convenience) or the position where the match node should be, server 120 proceeds to look at the descendents of the match node to see if they have the same cookie. If there is a descendent, it has the same cookie, and there are no blocking (defined below) cookie(s) (310—yes), then the server coalesces the cookie in the descendent into the cookie at the match node (312), by removing the cookie located at the descendent. Furthermore, if the descendant node from which the cookie is removed is a leaf node, that node is pruned from the trie, because the path and cookie information for the now-empty leaf node are completely contained within the match node, which is an ancestor of the leaf node. If the descendent node from which the cookie is removed is not a leaf node, then it may collapse into its parent node according to the collapsing rules discussed above.

In the embodiments that process cookies as individual name-value pairs, two cookies are the same if they both have the same name and the same value. Two cookies are not the same if they have the same name but different value. However, cookies with different names are neither the same nor not the same; they are neutral with respect to each other. For example, if one cookie is "Customer="ACME"" and the other cookie is "Customer="ACME"", then the two cookies are the same. However, if one cookie is "Customer="ACME"" and the other cookie is "Customer="ACM"", then the cookies are not the same. If one cookie is "Customer="ACME"", and the other is "Shipping="FedEx"", then the cookies are neutral with respect to each other.

In embodiments that process cookies as sets of name-value pairs, two cookies are the same (and thus are treated as "matching cookies"), if:

both cookies, after removing any redundant (i.e., having identical name-value) adjacent name-value pairs, have a one-to-one correspondence, i.e., for each name-value pair in one cookie, there is the same pair (same name and same value) in the other; and if one cookie has some name-value pairs of the same name but different values, then the relative order of appearance of the pairs with the same name but different values in one cookie must be the same in the other.

For example, if one cookie is "A="1"", "B="2"", and "C="3"" and the other is "A="1"", "B="2"", and "C="3"", then the two are the same. If one cookie is "A="1"", "B="2"", and "C="3"" and the other is "A="1"", "B="4"", and "C="3"", then the two are not the same. If one cookie is "A="1"", "A="2"", "B="2"", and "C="1"" and the other is "A="1"", "B="2"", "A="2"", and "C="1"", then the two are the same because there is a one-to-one correspondence and the pairs with name "A" had the same relative order in both cookies; the "A="1"" pair appeared before the "A="2"" pair in both cookies. If one cookie is "A="2"", "B="2"", "A="1"", and "C="1"", and the other is "A="1"", "B="2"", "C="1"", and "A="2"", then the two are not the same because, even though there is a one-to-one correspondence, "A="2"" appeared before "A="1"" in one cookie and "A="2"" appeared after "A="1"" in the other. Note that the relative order of pairs having the same name can be determined by ignoring all pairs (if any) in the cookie having other names.

In embodiments that process cookies as individual name-value pairs, a blocking cookie is a cookie that is stored at a node between two nodes along the same trie path that have the same cookie, and the cookie stored at the node in between is not the same as nor neutral with respect to the two same cookies. For example, if on a trie path, nodes X and Z have the same cookie "A="1"" but there is a node Y in between, with a cookie "A="2"", then the cookie at node Y is a blocking cookie. If, however, the cookie at node Y is "B="5"", then the cookie at node Y is neutral and not blocking. Having no cookie stored at the node at all is also considered not blocking.

In embodiments that process cookies as sets of name-value pairs, a blocking cookie is a cookie that is stored at a node between two nodes along the same trie path that have the same cookie, and the cookie stored in the node in between is not the same as the two same cookies. Note that in these embodiments, only nodes with no cookie stored at all are considered not blocking.

After coalescing, nodes in the trie may be collapsed, if possible, according to the collapsing rules discussed above. Furthermore, if the descendent with the same cookie is a leaf node, the leaf node may be pruned from the trie entirely (for reasons discussed below). Further details on coalescing and blocking cookies are described in relation to FIGS. 6A-6F.

If there is a blocking cookie, no descendent has the same cookie, or the match node (or its position) is a leaf (310—no), or once coalescing and any possible collapsing is completed (312), server 120 proceeds to check if the ancestors of the match node have the same cookie, without any blocking cookies in nodes between the ancestor(s) and the match node (314). If there is no cookie in any ancestor that is the same or if there is a blocking cookie (314—no), then the cookie is stored at the match node (316). In embodiments that process cookies as individual name-value pairs, storage of the cookie involves insertion into the node, if there is no cookie of the same name and different value already at the node, or updating the value of the cookie with the same name, if a cookie of the same name and different value is already stored at the node. In embodiments that process cookies as sets of name-value pairs, storage of the cookie involves insertion into the node, if there is no cookie already at the node, or replacing one cookie with another cookie, if a cookie is already stored at the node. If the match node position has no node yet and a cookie is to be stored at that position, a new node is created. Collapsed nodes may be "un-collapsed" to accommodate the new node, if appropriate.

If any ancestor has the same cookie and there are no blocking cookies in any node between the match node and that ancestor (314—yes), then the cookie is not stored at the match node (318) (for reasons discussed below). Any cookie already at the match node is removed. If the match node position does not have a node there already, then a new node is not created. The cookie at the match node is coalesced into the cookie at the ancestor node by not storing the cookie at the match node. Furthermore, a child node of the match node can be collapsed into the match node, if appropriate. Further details about checking the ancestor for the same cookie or set of cookies and not storing the cookie at a node is described in relation to FIGS. 6A-6F.

When two nodes on the same trie path have the same cookie and there are no blocking cookie(s) in between, the same cookie is deemed to be acceptable for sending to both the prefix path attribute and the other path attribute, assuming that both cookies have the same domain attribute. This is so because the two paths are considered to be sufficiently related, such that sending the cookie with the prefix path without sending the other same cookie is sufficiently safe. If there is a blocking cookie, however, then the two paths with the same cookie are not considered to be sufficiently related to send only the cookie with the prefix path attribute. In that case, both cookies that are same are kept within the data structure, so that requests to the longer path include both cookies. The coalescing of a cookie into another reflects the consideration that a cookie needs not be stored in the trie because its path attribute and the prefix path attribute of another cookie that's the same are sufficiently related, such that sending only the cookie with the prefix path attribute is acceptable. However, there is no coalescing if there is a blocking cookie because, in that case, sending just the cookie with the prefix path attribute is not acceptable. Furthermore, collapsing nodes maintains the invariance, within the trie, of the keys of cookies observed (i.e., the proper path attributes are maintained). It maintains the invariance of the path attributes of cookies stored in the trie by protecting the integrity of the keys in the trie associated with the cookies. It maintains the invariance of the path attributes of cookies observed but not stored in the trie by protecting the keys of cookies that are used in their place.

Figure 4:
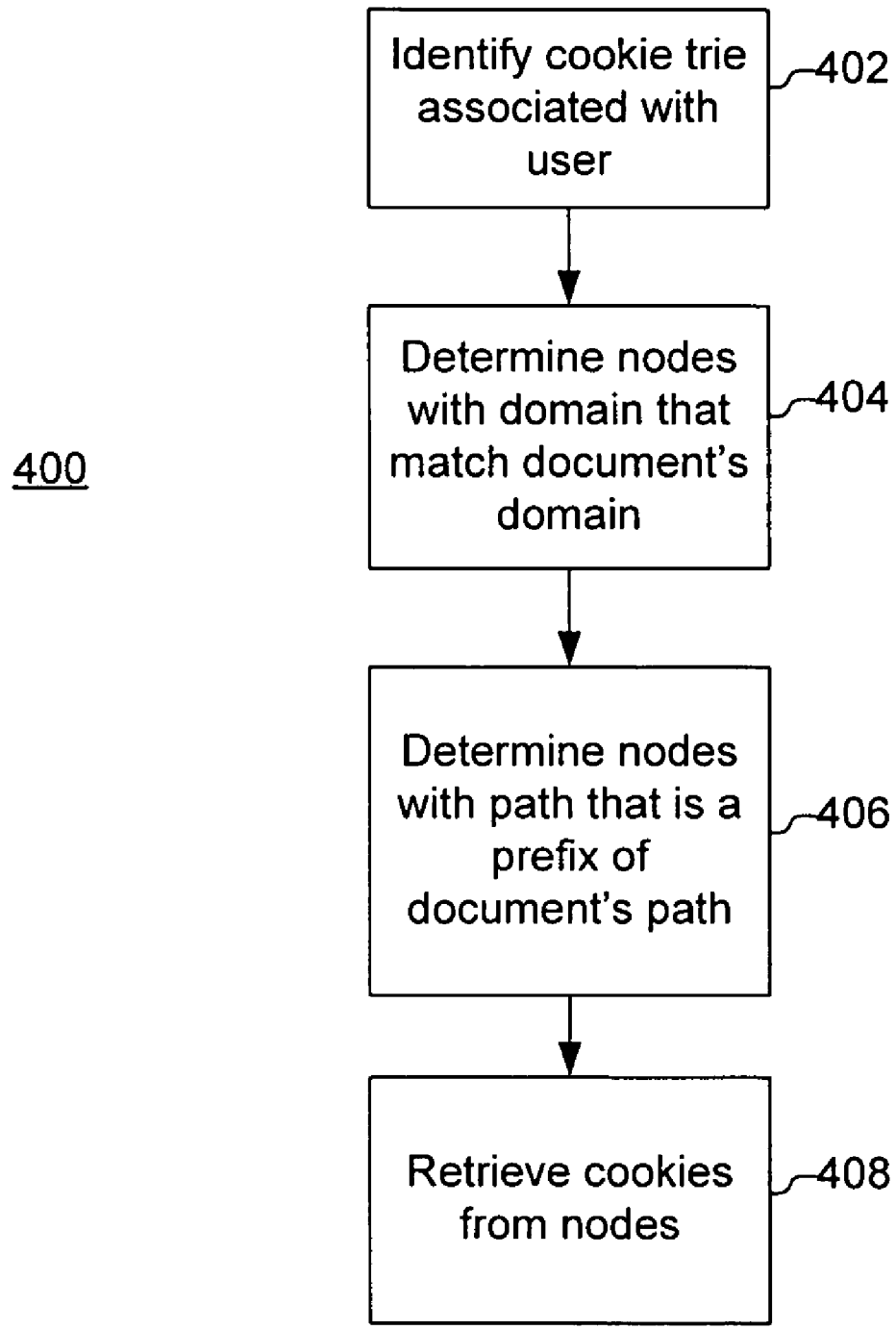
FIG. 4 is a flowchart illustrating retrieval of authorized cookies from the cookie cache for use in a prefetch operation, according to some embodiments of the invention.

FIG. 4 is an exemplary process 400 for retrieving cookies for inclusion in a prefetch request, according to some embodiment of the invention. Assuming that server 120 has already identified the document to be prefetched and the domain and path of the document, server 120 first identifies the cookie trie in cookie cache 125 that corresponds to the client for which the document is prefetched (402). After the trie is identified, server 120 searches the trie to find the node(s) associated with the hashed domain attribute(s) that correspond to domain attribute(s) that the domain of the document domain-matches (404). Then, server 120 searches, for each respective set of nodes associated with a domain that the document's domain domain-matches, for the node(s) within each respective set that are associated with a path that is an exact match (the match node) of the document's path or a prefix of the document's path (406). From all the nodes found in step 406, server 120 retrieves any stored cookies from those nodes. For each hashed domain attribute corresponding to a domain attribute that the domain of the document domain-matches, retrieval begins at the match node or the deepest node that represents a prefix of the path of the document and continues upward, towards the root.

Figure 5:
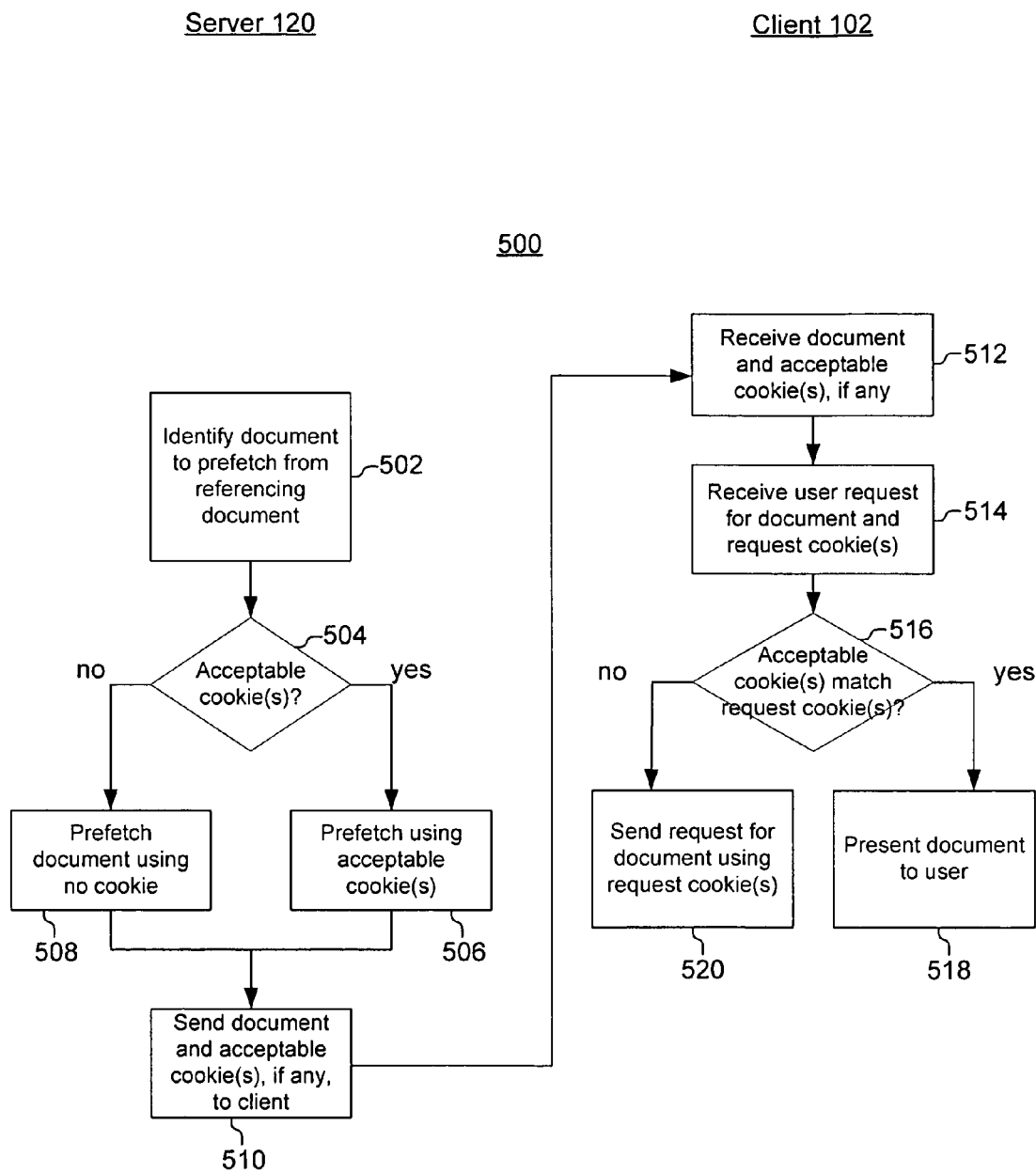
FIG. 5 is a flowchart illustrating a prefetch and preload operation that utilizes the cookie cache, according to some embodiments of the invention.

FIG. 5 is an exemplary process 500 for prefetching documents, according to some embodiments of the invention. Server 120 identifies the document to be prefetched (502). In some embodiments, the document to be prefetched may be identified from a referencing document. A referencing document may be any document that identifies other documents available on any web host 134. For example, a document listing the results of a web search may be a referencing document, as it identifies other documents (in this case, documents matching the search criteria) that may be available on web hosts 134. Then, server 120 retrieves cookie(s) from cookie cache 125 for inclusion in the prefetch request (504), in accordance with the process illustrated in FIG. 4. Within the request, retrieved name-value pairs are ordered by path, from the more specific path to the less specific path. In embodiments that process cookies as sets of name-value pairs, name-value pairs in the union of retrieved cookies may be reordered by path attribute. If server 120 finds and retrieves at least one cookie from cookie cache 125 (504—yes), server 120 prefetches the document from the web host using the retrieved cookie(s) (506). If server 120 retrieves no cookie from cookie cache 125 (504—no), then the prefetch is performed with no cookie in the prefetch request (508). Once the document is prefetched and received by server 120, it is sent to the client assistant 106 (i.e., preloading the document), along with any cookie(s) included in the prefetch request (510).

Client assistant 106 receives the prefetched document and any cookies included in the prefetch request (512). Client assistant 106 may receive a request from application 104, in some instances generated by a user, for the preloaded document (514). The request from application 104 may include at least one cookie from the set of cookies stored at client 102. Client assistant 106 compares the cookies used in the prefetch request to the cookies in the client request from application 104 (516). If they match (516—yes), then the prefetched document is presented to the user through application 104 (518). For matching purposes, both the cookies used in the prefetch request and the cookies in the client request are treated as sets of name-value pairs. The process for determining whether two sets of name-value pairs match is described above. If the two sets of name-value pairs do not match (516—no), client assistant 106 sends the request from application 104 and any cookies included in the request to the web host (520).

FIGS. 6A-6F illustrate various states of a sub-trie within a cookie trie and the effect of cookie insert or update operations on the sub-trie, according to some embodiments of the invention. FIGS. 6A-6F, for simplicity, show only a portion of an exemplary client's cookie trie. Particularly, FIGS. 6A-6F show the sub-trie for a specific domain, with the root node 602 of the sub-trie representing the string formed by prepending the hashed domain attribute to the initial forward slash character of all paths within that domain. For simplicity of explanation, all the cookies in FIGS. 6A-6F are assumed to be individual name-value pairs, all of the same name. It should be appreciated, however, that the characteristics and principles described below extend to sets of name-value pairs and to a cookie trie overall.

Figure 6A:
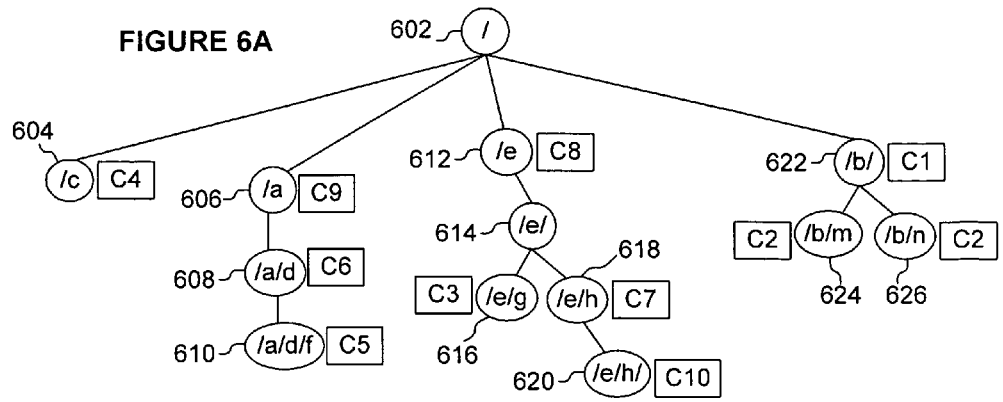
FIGS. 6A-6F are diagrams of various states of sub-tries within a cookie trie, according to some embodiments of the invention.

FIG. 6A illustrates the sub-trie of observed cookies and their paths for a specific hashed domain attribute for a particular client at one point in time.

Node 608, associated with path "/a/d", may be formed by the collapsing of two nodes representing paths "/a/" and "/a/d". The cookie C6 would have been stored at the node representing path "/a/d", not the node representing path "/a/", before the collapsing, in accordance with the collapsing convention described above, that the cookie stored at a resulting node has a path attribute that is the same as the path attribute represented by the child node that collapsed into its parent node. Similarly, cookie C5, in node 610, would have been stored at an un-collapsed node representing key "/a/d/f" before any collapsing occurred.

Node 614 (path "/e/") is not collapsed into node 612, nor is it simply deleted because there is no cookie there. The node 614 is kept in the sub-trie as shown as a reminder that the longest prefix of the paths represented by nodes 616 and 618 is "/e/", not "/e". This maintains the integrity of the keys to cookies C3 or C7. Node 614 is not collapsed into node 612 because collapsing the two is contrary to the collapsing convention described above. Node 616 or 618 is not collapsed into node 614 because in a PATRICIA trie, only an only child node can collapse into its parent. Also, nodes 624 and 626, both with cookies C2, are present in the trie because, even though both have the same cookie, they are for different paths that are not prefixes of each other. A request to the path attribute "/b/m" will not include the cookie with path attribute "/b/n" and vice versa, as /b/n is not a prefix of /b/m and vice versa. Thus, both have to be stored, so that cookie C2 is included in a request to either path.

Figure 6B:
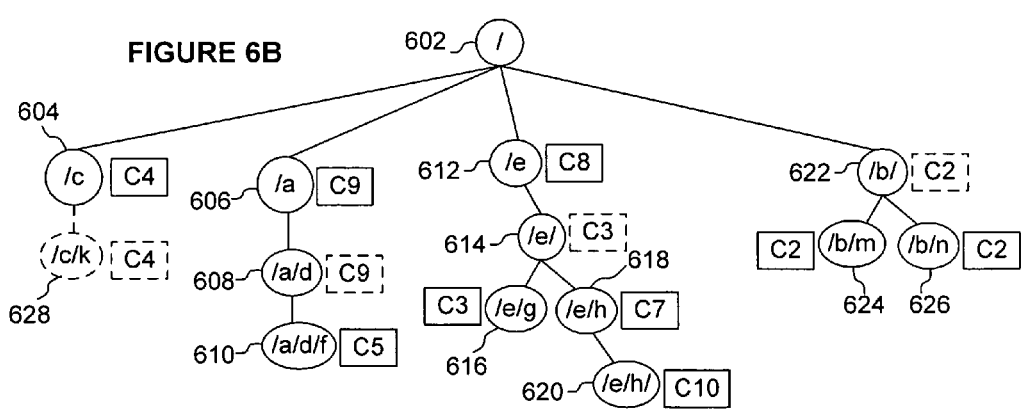

FIG. 6B illustrates the cookie insert and update operations that can be performed on the sub-trie. The match nodes, if not already in the sub-trie, and cookies to be inserted or updated are indicated by dotted outlines. In FIG. 6B, there is an insertion of a cookie C4, with path "/c/k", to the position of match node 628. At node 608, there is an update of the cookie from C6 to C9, both with paths "/a/d". There is an insertion of cookie C3, with path "/e/" to node 614. At node 622, there is an update from cookie C1 to cookie C2, both with path "/b/". It should be appreciated that the insertion and update operations may be performed simultaneously or in any order, predefined or otherwise.

Figure 6C:
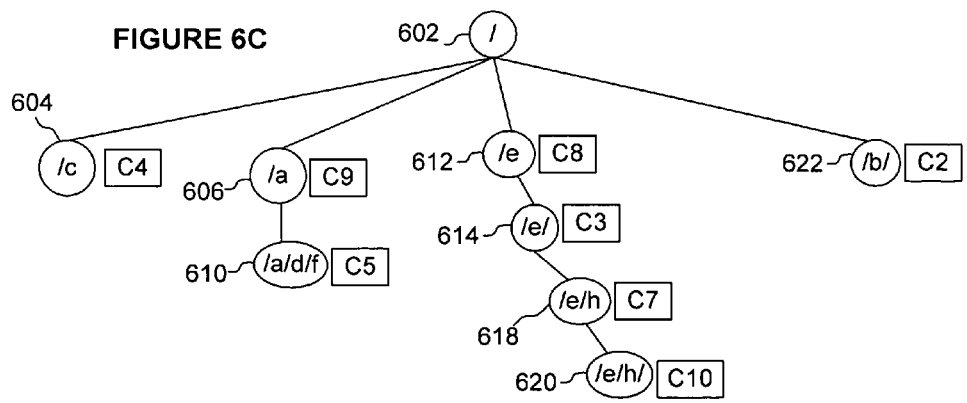

FIG. 6C illustrates the resulting sub-trie after completing the operations illustrated in FIG. 6B. For the insert of C4, the result is that the cookie C4 to be inserted is not stored and the match node 628 is not created. This is in accordance with the process illustrated in FIG. 3. Once C4 is received and determined to be cacheable, server 120 searches the trie for the match node position, which is node 628, representing path "/c/k". From that position, the descendents are checked if they have the same cookie C4. In this case, there is no descendent. Thus, server 120 moves on to check the ancestor(s). Here, ancestor node 604 has the same cookie C4 and there are no blocking cookies in between. Thus, the cookie C4 is not stored at node 628. Furthermore, because node 628 is not present in the sub-trie yet and C4 is not stored there, node 628 is not created.

For the update at node 608, the result is that the updated C9 is not stored, cookie C6 is removed from node 608, and node 610 is collapsed into node 608 after cookie C6 is removed. Once server 120 finds the match node position for update cookie C9, which is node 608, descendents are checked for the same cookie. Here, the only descendent is node 610, which has a different cookie C5. Thus, there is no coalescing nor collapsing at that point. The ancestor(s) is then checked for the same cookie. The ancestor node is node 606, with the same cookie C9, and there are no blocking cookies in between. Thus, the new C9 is not stored. Furthermore, because this is an update and the new C9 is not stored, the cookie C6 at 608 is removed from the sub-trie, leaving node 608 with no cookie. With node 608 now left with no cookie, it is possible to collapse node 610 into it. Following the collapsing convention described above, node 610 is collapsed into node 608.

For the insert of C3 at node 614, the result is that the inserted cookie C3 is stored and node 616, along with the cookie C3 stored there, is removed. After server finds the match node 614, it checks the descendents for the same cookie. Descendent nodes 618 and 620 have different cookies. However, descendent node 616 has the same cookie C3. Thus, cookie C3 at node 616 is coalesced into cookie C3 at node 614, by removing the cookie C3 in node 616. Furthermore, because node 616 has no further descendents (i.e. it is a leaf node), it is pruned from the trie. Then the ancestors are checked. Ancestor node 612 has a different cookie C8. Thus, cookie C3 is stored at node 614. Furthermore, there is no collapsing of node 614 into node 612 because they have different cookies. Node 616 is pruned and not collapsed into node 614 because collapsing node 616 into node 614 would change the path represented by node 614, destroying the invariance of the keys to cookies C7 and C10.

For the update of C2 to node 622, the result is that the C2 replaces C1 at node 622 and nodes 624 and 626 are removed. After finding match node 622, the descendents 624 and 626 are checked. Here, both nodes 624 and 626 have copies of cookie C2, with no blocking cookies in between. Thus, both cookies are removed; cookies C2 at nodes 624 and 626 are coalesced into cookie C2 at node 622. Furthermore, because both nodes 624 and 626 have no further descendents (are leaf nodes), they are pruned from the trie. There are no cookies in the ancestors of node 622, and thus the C2 is stored at node 622.

Figure 6D:
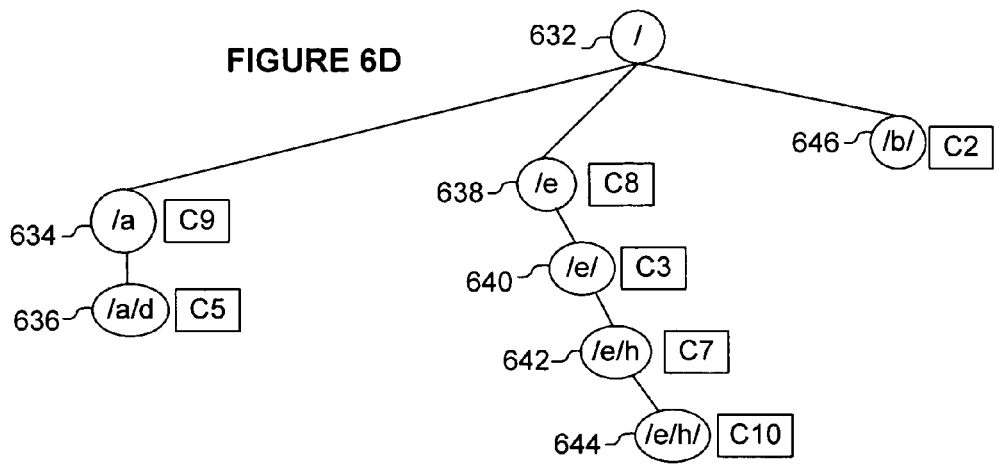

FIG. 6D illustrates another sub-trie at one point in time. This sub-trie also has a root node that represents a hashed domain attribute prepended to the initial forward slash character.

Figure 6E:
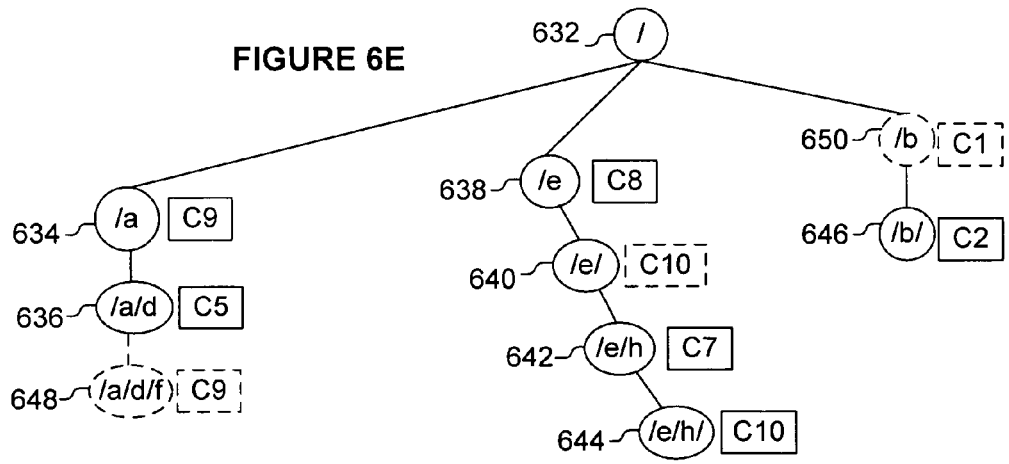
Figure 6F:
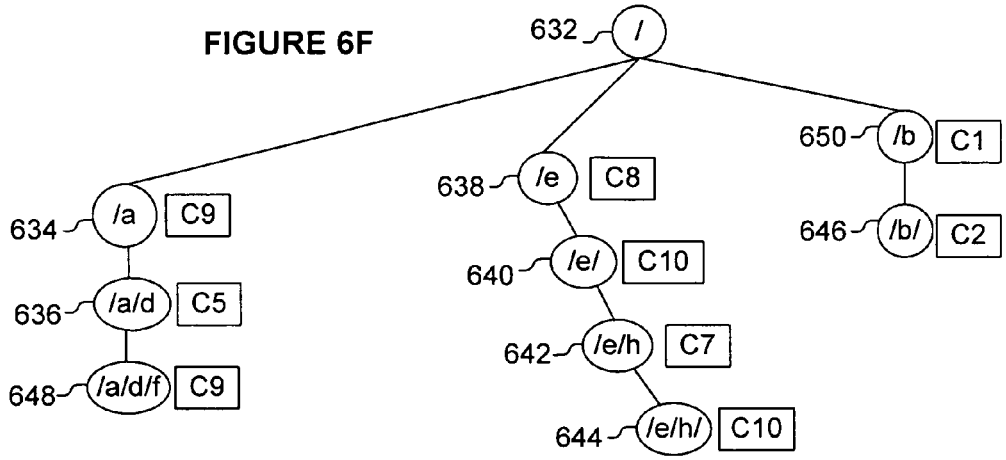

FIG. 6E illustrates operations performed on the sub-trie of FIG. 6D. There is an insertion of cookie C9 (path "/a/d/f") to match node 648, an update of C3 to C10 (both with path "/e/") at node 640, and an insertion of cookie C1 (path "/b") to node 650. The results are shown in FIG. 6F. From the position of match node 648, there are no descendents, but there is a blocking cookie C5 node 636. Thus, the inserted C9 is stored at created node 648 and this insertion does not result in the collapsing of any nodes. As for the update to cookie C10, there is a descendent node 644 with the same cookie, but there is a blocking cookie C7 at node 642. Furthermore, parent node 638 has different cookie C8. Thus, the new cookie C10 is stored and there is no coalescing or collapsing. For the insertion of cookie C1, the descendent node 646 has different cookie C2, and there are no cookies in ancestor node 632. Thus, node 650 is created and C1 is stored there. Note that node 646 is "un-collapsed" to accommodate the new node 650.

Figure 7:
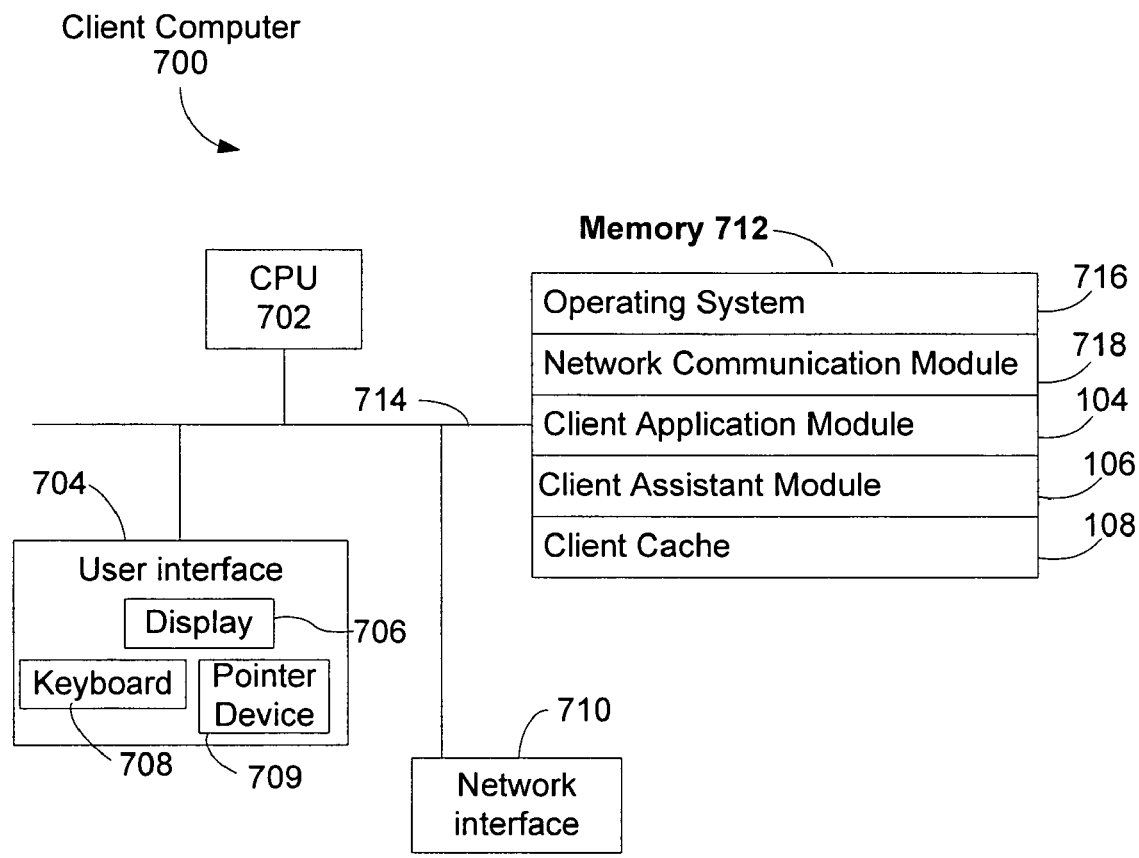
FIG. 7 is a diagram of an exemplary client computer, according to some embodiments of the invention.

FIG. 7 depicts a client computer 700, in accordance with some embodiments of the invention. Client computer 700 typically includes one or more processing units (CPU's) 702, one or more network or other communications interfaces 710, memory 712, and one or more communication buses 714 for interconnecting these components. The client computer 700 may also include a user interface 704 comprising, for instance, a display device 706, keyboard 708 and pointer device 709. Memory 712 may include high speed random access memory and may also include non-volatile memory, such as one or more magnetic disk storage devices. Memory 712 may optionally include one or more storage devices remotely located with from the CPU(s) 702. In some embodiments, the memory 712 stores the following data structures, programs, and instructions, or a subset or superset thereof:

an operating system 716 that includes procedures for handling various basic system services and for performing hardware dependent tasks;

a network communication module (or instructions) 718 that is used for connecting the client computer 700 to other computers via the one or more communication network interfaces 710;

an application (or instructions) 104, such as a web browser application, for receiving a user request for a document and rendering the requested document on a computer monitor or other user interface device;

a client assistant module (or instructions) 106, for sending user requests to server 120, receiving prefetched documents, and determining if the documents are proper for presentation to the user through application 104; and a client cache 108, as described above.

Each of the above identified modules and applications corresponds to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 712 may store a subset of the modules and applications identified above. Furthermore, memory 712 may store additional modules, applications and data structures not described above.

Figure 8:
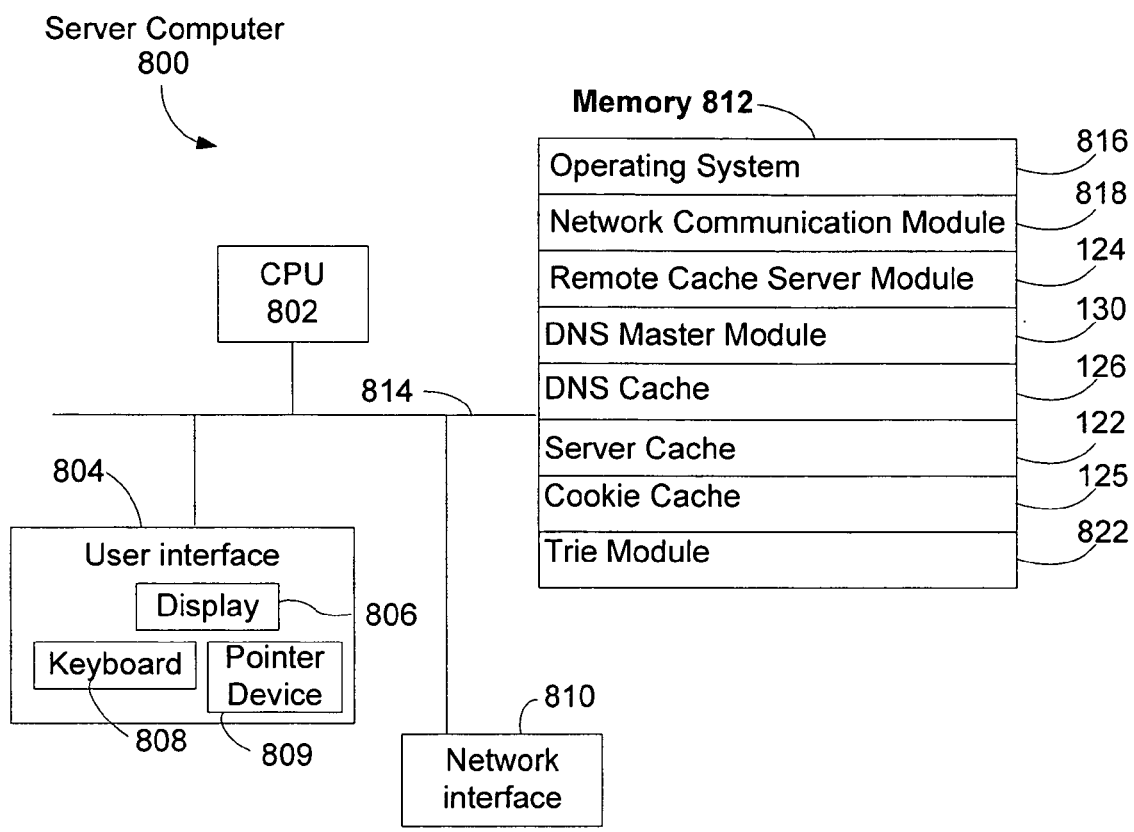
FIG. 8 is a diagram of an exemplary server computer that operates the cookie cache, according to some embodiments of the invention.

FIG. 8 depicts a server computer 800 in accordance with an embodiment of the invention. Server computer 800 typically includes one or more processing units (CPU's) 802, one or more network or other communications interfaces 810, memory 812, and one or more communication buses 814 for interconnecting these components. The server computer 800 may optionally include a user interface 804 comprising, for instance, a display device 806, keyboard 808 and pointer device 809. Memory 812 may include high speed random access memory and may also include non-volatile memory, such as one or more magnetic disk storage devices. Memory 812 may optionally include one or more storage devices remotely located from the CPU(s) 802. The memory 812 stores the following data structures, programs, and instructions, or a subset or superset thereof:

an operating system 816 that includes procedures for handling various basic system services and for performing hardware dependent tasks;

a network communication module (or instructions) 818 that is used for connecting the server computer 800 to other computers via the one or more communication network interfaces 810 and one or more communication networks, such as the Internet, other wide area networks, local area networks, metropolitan area networks, and the like;

a remote cache server module (or instructions) 124 for identifying documents to be prefetched, prefetching such identified documents using cookies retrieved from cookie cache 125, and sending prefetched documents to the client cache assistant 106;

a DNS master module (or instructions) 130 for retrieving the IP address of a web server that hosts the requested documents;

a DNS cache 126 for storing records that map hostnames to IP addresses;

a server cache 122 for storing and managing a plurality of documents;

a cookie cache 125 for storing cookies observed from a client and those observed from a host, for use in prefetching operations; as described above, in some embodiments, the cookies stored in the cookie cache 125 may be stored in tries within the cache 125;

a trie module (or instructions) 822 for searching the tries in cookie cache 125, performing insertion or update operations for cookies and retrieving cookies in cookie cache 125, and manipulating nodes in the tries in cookie cache 125 to preserve invariance within the cookie cache of certain path attribute matching criteria.

Each of the above identified modules and applications corresponds to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 812 may store a subset of the modules and applications identified above. Furthermore, memory 812 may store additional modules, applications and data structures not described above.

Although FIG. 8 shows server 800 as a number of discrete items, FIG. 8 is intended more as a functional description of the various features which may be present in server 800 rather than as a structural schematic of the embodiments described herein. In practice, and as recognized by those of ordinary skill in the art, items shown separately could be combined and some items could be separated. For example, some items shown separately in FIG. 8 could be implemented on single servers and single items could be implemented by one or more servers. The actual number of servers in server 800 and how features are allocated among them will vary from one implementation to another, and may depend in part on the amount of data traffic that the system must handle during peak usage periods as well as during average usage periods.

The foregoing descriptions of specific embodiments of the present invention are presented for purposes of illustration and description. For example, any methods described herein are merely examples intended to illustrate one way of performing the invention. They are not intended to be exhaustive or to limit the invention to the precise forms disclosed. Obviously many modifications and variations are possible in view of the above teachings. Furthermore, if feasible, any single component described herein may be replaced with more than one of the same component, or multiple components may be incorporated into a single component. The embodiments were chosen and described in order to best explain the principles of the invention and its practical applications, to thereby enable others skilled in the art to best utilize the invention and various embodiments with various modifications as are suited to the particular use contemplated. Furthermore, the order of steps, tasks or operations in the methods described above are exemplary, and where appropriate the present invention also includes methods, systems and computer program products that implement or use different orderings of such steps, tasks or operations, as well as subsets and/or superset of those steps, tasks or operations. It is intended that the scope of the invention be defined by the following claims and their equivalents.

What is claimed is:

1. A method of utilizing cookies, comprising:

at a server, accessing a data structure that stores cookies, wherein the data structure associates a path, a name, and a value with each cookie stored;

receiving a first cookie, the first cookie having a first path, a first name, and a first value;

not storing the first cookie in the data structure if a condition is met, and storing the first cookie in the data structure if the condition is not met;

wherein the condition is that there is a second cookie in the data structure whose associated name and value are the same as the first name and first value respectively, the path associated with the second cookie is a prefix of the first path, and there is no third cookie in the data structure
  whose associated name is the same as the first name,
  whose associated path is a prefix of the first path, and
  for which the path associated with the second cookie is a prefix of the path associated with the third cookie.

2. The method of claim 1, further comprising removing a fourth cookie from the data structure if:
  the name and value associated with the fourth cookie are the same as the first name and first value respectively;
  the first path is a prefix of the path associated with the fourth cookie; and
  there is no fifth cookie stored in the data structure
    whose name is the same as the name associated with the fourth cookie,
    whose path is a prefix of the path associated with the fourth cookie, and
    for which the first path is a prefix of the path associated with the fifth cookie.

3. The method of claim 1, further comprising when the condition is met:
  removing any cookie in the data structure whose associated path and name are the same as the first path and first name respectively.

4. The method of claim 3, wherein the data structure is a trie data structure in which each node corresponds to a path and each node stores cookie data for cookies, if any, whose paths match the path corresponding to the node, and further comprising when the condition is met:
  identifying a first node in the data structure whose path corresponds to the first path; and
  collapsing the first node, within the data structure, into a second node, if the second node is an only child of the first node and the first node no longer stores any cookie data.

5. The method of claim 1, further comprising:
  identifying a document, associated with the first path for prefetching;
  selecting the first cookie, if present within the data structure, and other cookies in the data structure whose associated paths are prefixes of the first path; and
  prefetching the document using the selected first cookie and the selected other cookies, if any.

6. The method of claim 5, further comprising sending the document and the first cookie and the other cookies, if used to prefetch the document, to a remote computer.

7. The method of claim 5, wherein the document is identified from a referencing document.

8. A computer program product stored in one or more memory devices, comprising one or more programs configured for execution by one or more processors at a server, the one or more programs comprising instructions to: access a data structure that stores cookies, wherein the data structure associates a path, a name, and a value with each cookie stored; receive a first cookie, the first cookie having a first path, a first name, and a first value; not store the first cookie in the data structure if a condition is met, and store the first cookie in the data structure if the condition is not met; wherein the condition is that there is a second cookie in the data structure whose associated name and value are the same as the first name and first value respectively, the path associated with the second cookie is a prefix of the first path, and there is no third cookie in the data structure whose associated name is the same as the first name, whose associated path is a prefix of the first path, and for which the path associated with the second cookie is a prefix of the path associated with the third cookie.

9. The computer program product of claim 8, further comprising instructions to remove a fourth cookie from the data structure if:
  the name and value associated with the fourth cookie are the same as the first name and first value respectively;
  the first path is a prefix of the path associated with the fourth cookie; and
  there is no fifth cookie stored in the data structure
    whose name is the same as the name associated with the fourth cookie,
    whose path is a prefix of the path associated with the fourth cookie, and
    for which the first path is a prefix of the path associated with the fifth cookie.

10. The computer program product of claim 8, further comprising instructions that execute when the condition is met to:
  remove any cookie in the data structure whose associated path and name are the same as the first path and the first name respectively.

11. The computer program product of claim 10, wherein the data structure is a trie data structure in which each node corresponds to a path and each node stores cookie data for cookies, if any, whose paths match the path corresponding to the node, and further comprising instructions that execute when the condition is met to:
  identify a first node in the data structure whose path corresponds to the first path; and
  collapse the first node, within the data structure, into a second node, if the second node is an only child of the first node and the first node no longer stores any cookie data.

12. The computer program product of claim 8, further comprising instructions which execute to:
  identify a document, associated with the first path, for prefetching;
  select the first cookie, if present within the data structure, and other cookies in the data structure whose associated paths are prefixes of the first path; and
  prefetch the document using the selected first cookie and the selected other cookies, if any.

13. The computer program product of claim 12, further comprising instructions which execute to send the document and the first cookie and the other cookies, if used to prefetch the document, to a remote computer.

14. The computer program product of claim 12, wherein the instructions which execute to identify the document further comprise instructions which execute to identify the document from a referencing document.

15. A system for utilizing cookies, comprising:
  a server with one or more processors and memory;
  a data structure stored in the memory, wherein the data structure is configured to store a plurality of cookies, including a path, a name, and a value for each respective cookie stored; and
  a data structure interface module stored in the memory, the data structure interface module executing on the one or more processors to:
    receive a first cookie, the first cookie having a first path, a first name, and a first value;
    not store the first cookie in the data structure if a condition is met, and store the first cookie in the data structure if the condition is not met;

wherein the condition is that there is a second cookie in the data structure whose name and value are the same as the first name and first value respectively, the path of the second cookie is a prefix of the first path, and there is no third cookie stored in the data structure
whose name is the same as the first name,
whose path is a prefix of the first path, and
for which the path of the second cookie is a prefix of the path of the third cookie.

16. The system of claim 15, wherein the data interface module further executes on the one or more processors to remove a fourth cookie from the data structure if:
the name and value associated with the fourth cookie are the same as the first name and first value respectively;
the first path is a prefix of the path associated with the fourth cookie; and
there is no fifth cookie stored in the data structure
whose name is the same as the name of the fourth cookie,
whose path is a prefix of the path of the fourth cookie, and
for which the first path is a prefix of the path of the fifth cookie.

17. The system of claim 15, wherein the data interface module further executes when the condition is met to:
remove any cookie in the data structure whose path and name are the same as the first path and first name respectively.

18. The system of claim 17, wherein the data structure is a trie data structure in which each node corresponds to a path and each node stores cookie data for cookies, if any, whose paths match the path corresponding to the node, and wherein the data interface module further executes when the condition is met to:
identify a first node in the data structure whose path is the same as the first path; and
collapse the first node, within the data structure, into a second node, if the second node is an only child of the first node and the first node no longer stores cookie data.

19. The system of claim 15, wherein the data interface module further executes to:
identify a document, associated with the first path, for prefetching;
select the first cookie, if present within the data structure, and other cookies in the data structure whose paths are prefixes of the first path; and
prefetch the document using the selected first cookie and the selected other cookies, if any.

20. The system of claim 19, wherein the data interface module further executes to send the document and the first cookie and the other cookies, if used to prefetch the document, to a remote computer.

21. The system of claim 19, wherein the data interface module further executes to identify the document from a referencing document.

22. A server system for utilizing cookies, comprising:
one or more processors, and memory storing programs executed by the one or more processors;
means for accessing a data structure that stores cookies, wherein the data structure associates a path, a name, and a value with each cookie stored;
means for receiving a first cookie, the first cookie having a first path, a first name, and a first value;
means for not storing the first cookie in the data structure if a condition is met, and means for storing the first cookie in the data structure if the condition is not met;
wherein the condition is that there is a second cookie in the data structure whose associated name and value are the same as the first name and first value respectively, the path associated with the second cookie is a prefix of the first path, and there is no third cookie in the data structure
whose associated name is the same as the first name,
whose associated path is the same as the first path, and
for which the path associated with the second cookie is a prefix of the path associated with the third cookie.

* * * * *

UNITED STATES PATENT AND TRADEMARK OFFICE
CERTIFICATE OF CORRECTION

PATENT NO. : 7,600,028 B2 Page 1 of 1
APPLICATION NO. : 11/033411
DATED : October 6, 2009
INVENTOR(S) : Bjorn Marius Aamodt Eriksen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1275 days.

Signed and Sealed this

Fifth Day of October, 2010

David J. Kappos
*Director of the United States Patent and Trademark Office*